United States Patent [19]

Brown

[11] Patent Number: 5,417,531
[45] Date of Patent: May 23, 1995

[54] LOCKING CAM ANCHOR APPARATUS

[76] Inventor: Gordon A. Brown, 57 N. Alma School Rd. Apt. 313, Mesa, Ariz. 85201

[21] Appl. No.: 194,037

[22] Filed: Feb. 9, 1994

[51] Int. Cl.[6] .................. F16B 13/04; F16B 21/00
[52] U.S. Cl. .................. 411/344; 411/340; 411/21; 29/525.1
[58] Field of Search .............. 411/21, 340, 341, 342, 411/344, 345; 29/525.1

[56] References Cited

U.S. PATENT DOCUMENTS

| | | | |
|---|---|---|---|
| 499,444 | 6/1893 | Schumann | 411/344 |
| 1,199,297 | 9/1916 | Obeda | 411/344 |
| 1,210,451 | 1/1917 | France | 411/345 |
| 1,520,123 | 12/1924 | Gillen | 411/344 |
| 2,638,774 | 5/1953 | Wieman | 72/124 |
| 2,685,877 | 8/1954 | Dobelle | 411/21 X |
| 2,813,712 | 11/1957 | Stanis | 267/63 |
| 2,899,703 | 8/1959 | Johnson | 16/86 |
| 3,091,356 | 5/1963 | Simpkins | 220/25 |
| 3,325,955 | 6/1967 | Haut | 52/514 |
| 4,034,512 | 7/1977 | Lindal | 49/501 |
| 4,100,712 | 7/1978 | Hyman | 52/514 |
| 4,301,629 | 11/1981 | Farr | 52/99 |
| 4,669,936 | 6/1987 | Camilleri | 411/340 |
| 4,693,389 | 9/1987 | Kalen | 411/21 X |
| 4,704,057 | 11/1987 | McSherry | 411/344 X |
| 5,037,257 | 8/1991 | Kubic et al. | 411/344 X |

FOREIGN PATENT DOCUMENTS 675921 12/1963 Canada ................... 20/50
2458163 10/1976 Germany .

Primary Examiner—Neill R. Wilson
Attorney, Agent, or Firm—Jordan M. Meschkow; Lowell W. Gresham

[57] ABSTRACT

A reusable anchor apparatus removably securable to a panel. The reusable anchor apparatus includes a housing having an inner end, an outer end, a longitudinal axis extending therebetween, and a restraining member preventing insertion of the housing completely through the panel. The reusable anchor further includes a first finger pivotally coupled to the inner end of the housing, a second finger pivotally coupled to the inner end of the housing, opposing the first finger, and a plunger for moving the first finger and the second finger between a retracted position in which the fingers extend substantially parallel to the longitudinal axis, and an extended position in which the first finger and the second finger are substantially upright with respect to the longitudinal axis in opposing directions.

20 Claims, 4 Drawing Sheets

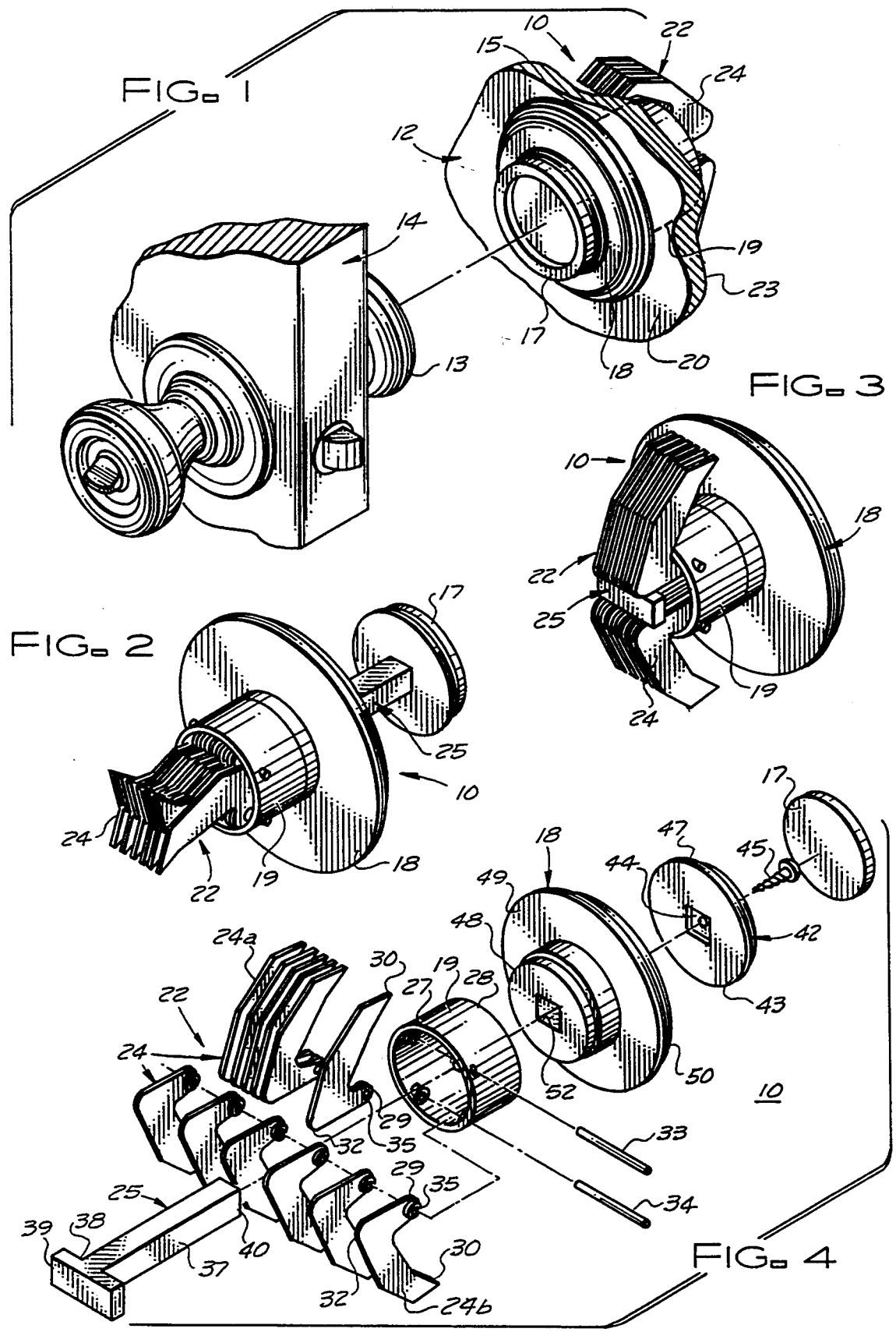

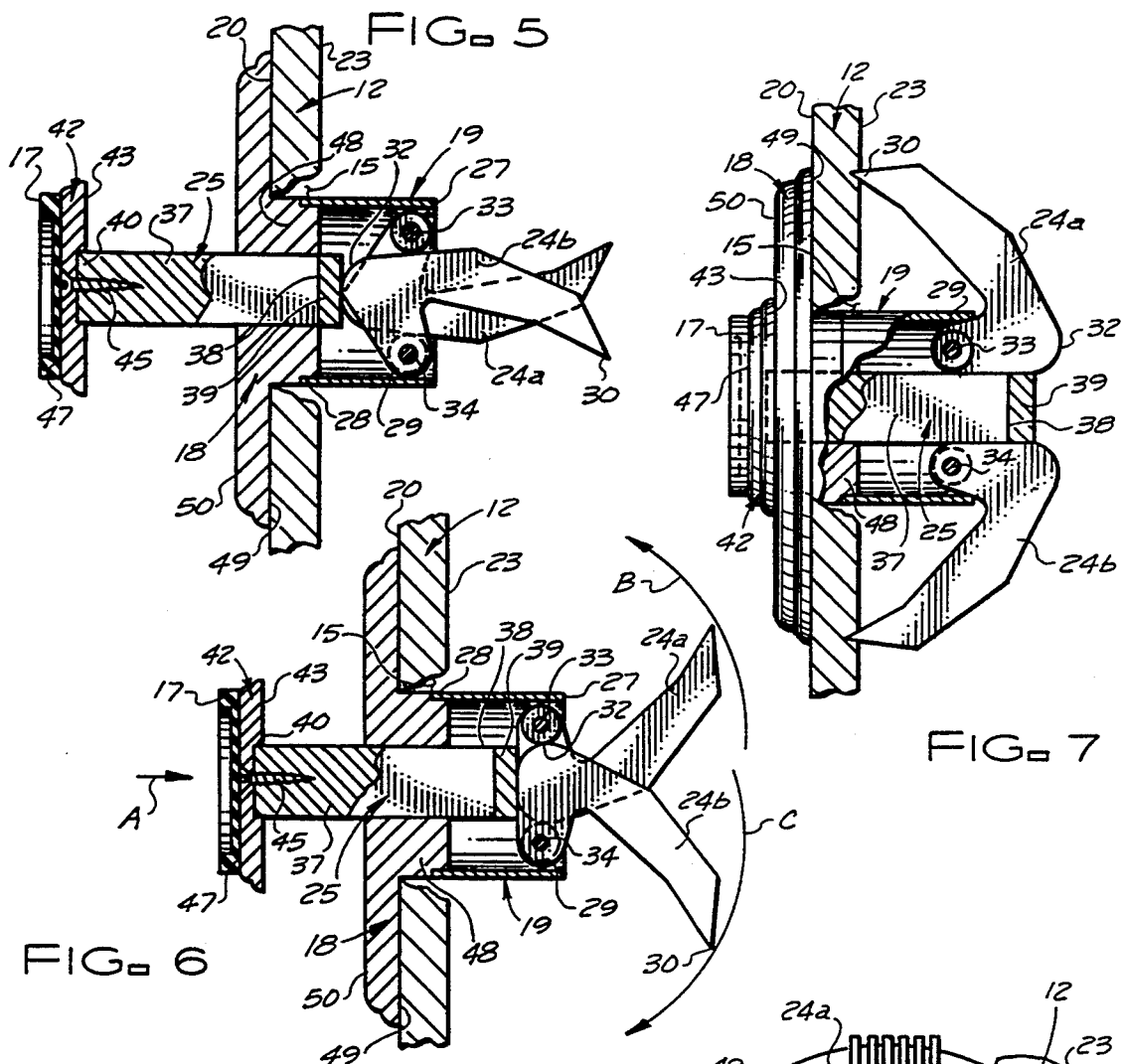
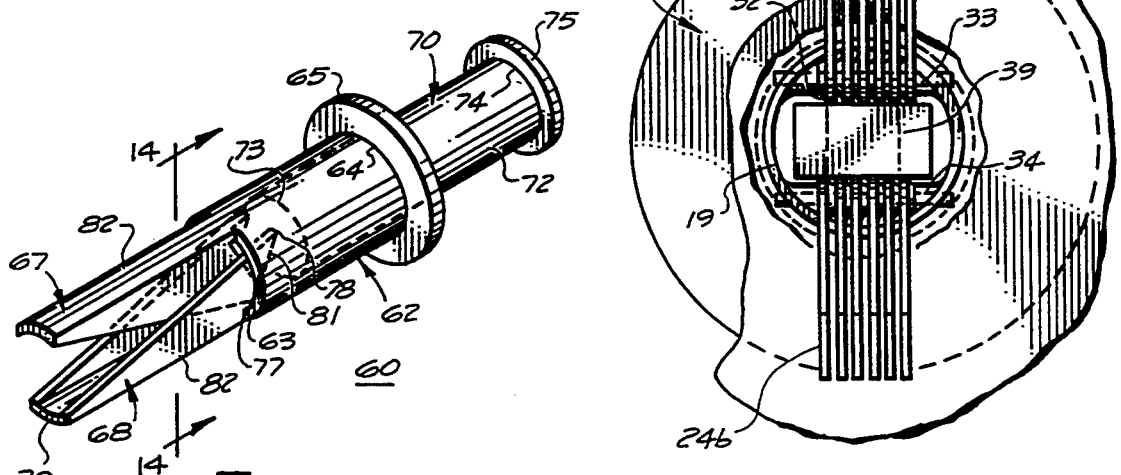

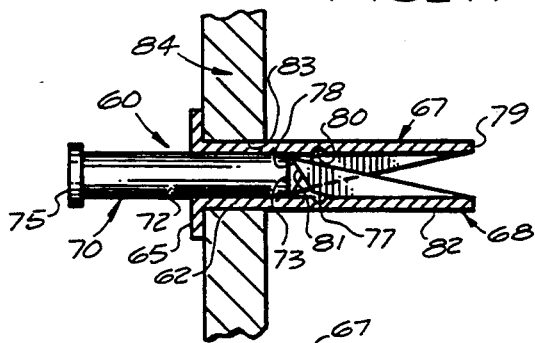
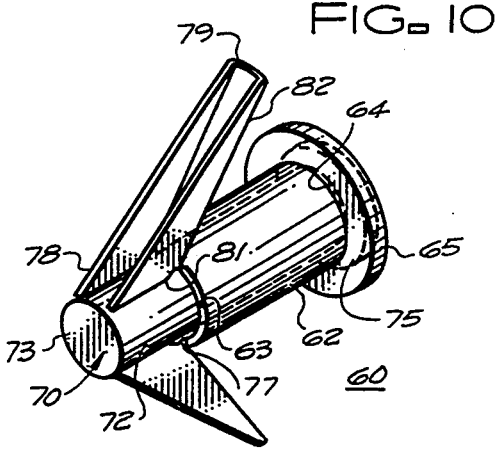
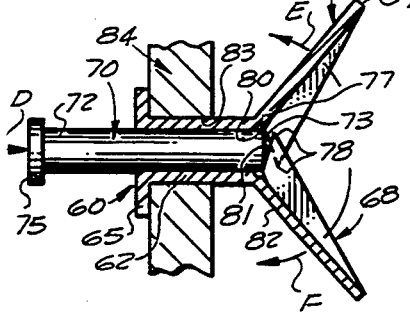
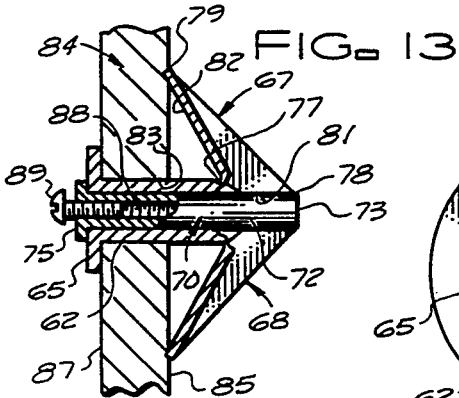
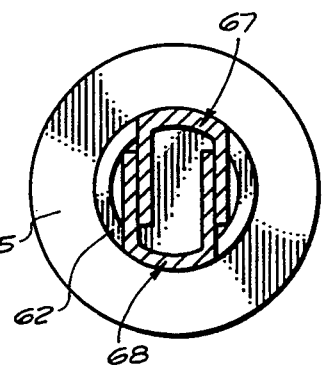
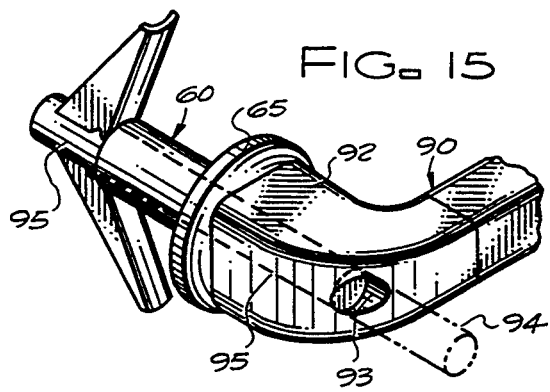
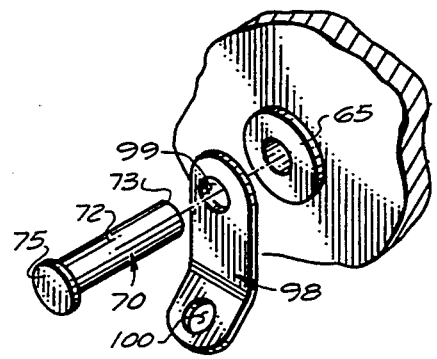
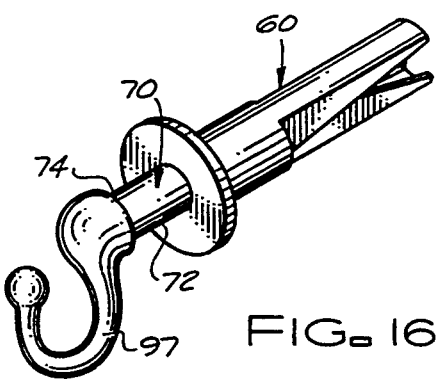

LOCKING CAM ANCHOR APPARATUS

BACKGROUND OF THE INVENTION

1. Field of the Invention

This invention relates to anchoring devices.

More particularly, the present invention relates to removeable and reusable anchor devices.

In a further and more specific aspect, the instant invention concerns anchor devices usable as wall repair fixtures.

2. Prior Art

Interior walls, especially in residential structures, are generally preferred to be maintained in an unmarred condition. This contributes to the overall neatness and esthetics of a room. In many cases an unmarred wall is a very transitory structure. Marring of walls occurs with great frequency and due to many causes.

One area subject to a great deal of marring is the area directly adjacent a conventional door. Door fixtures, such as doorknobs tend to damage walls when doors are opened unrestrainedly and too vigorously. Through the years, many devices or door stops have been developed to prevent damage to the walls adjacent doors. The devices typically consist of cushioning projections extending from the door. Many times, when these cushioning devices are not used, and in many cases when they are used but have become old and worn, a vigorously opened door will result in a hole being formed in the adjacent wall, corresponding to the size and shape of the doorknob. If the wall is cement, brick or some other material not easily broken, there is probably no cause for concern. However, if a wall employing sheathing material such as drywall, plaster or other easily broken material is used, as is more typically the case, especially for interior walls, a doorknob will punch a relatively large hole. This is generally an undesirable addition to a wall. The hole formed must now be repaired to provide an unblemished wall. Devices have been developed which aid in this repair. Most allow an individual to patch the hole. While this does temporally remove the hole, the hole may be reformed when the door is again vigorously opened without a door stop or when door stop failure occurs.

Walls are also marred by conventional anchor devices. In order to hang an object on a sheet of drywall, an anchor device must be used since a nail will not be adequately supported by the material. While there are various types of anchor devices, two types are the most common, a molly type anchor device and a toggle type anchor device. A molly type anchor device generally consists of a body which is inserted through an opening formed in the drywall. The body threadably receives a screw, which when threaded into the body, causes the body to be compressed against the inner surface of the hole formed in the wall. The compression of the body results in deformation, wherein portions of the body spread out, pressing against the material defining the hole and possibly over the inner surface of the drywall. This prevents withdrawal of the body, and firmly anchors the device to the wall. Toggle type anchor devices consist of wings spread by a spring. The wings are forced together and inserted through an opening formed in the wall. Once through the wall, the wings are expanded or toggled apart by the spring. As the screw is threaded through the wing assembly, the wing assembly is pulled firmly against the inner surface of the wall. Toggle devices cannot be removed from the wall once installed, since there is no apparatus for closing the wing to allow withdrawal from the opening in the wall.

These anchor devices are used to hang various items on a wall and are very effective for that function. When a person desires to remove an item from the wall, however, one problem becomes very apparent. The conventional anchor device such as a molly or a toggle described previously, cannot be removed from the wall, and cannot be reused. If they are forcibly removed, a relatively large and jagged opening is formed in the wall. In most instances, they are simply plastered over, possibly resulting in an unsightly bulge, or forced into the wall, causing a widening of the hole and damage to the inner surface of the wall material.

It would be highly advantageous, therefore, to remedy the foregoing and other deficiencies inherent in the prior art.

Accordingly, it is an object of the present invention to provide a new and improved anchor device.

Another object of the present invention is to provide an anchor device which will firmly and securely attach to a wall.

And another object of the present invention is to provide an anchor device which is removeable without causing damage to the wall.

Still another object of the present invention is to provide an anchor which may be used to close holes in a wall.

Yet another object of the present invention is to provide a new and improved door stop.

Yet still another object of the present invention is to provide an anchor which is relatively quick to install thereby saving time and money.

A further object of the instant invention is to provide an anchor which may be installed one handed.

And a further object of the instant invention is to provide an anchor which requires no tools for installation.

Yet a further object of the instant invention is to provide an anchor which may be reused.

SUMMARY OF THE INVENTION

Briefly, to achieve the desired objects of the present invention in accordance with a preferred embodiment thereof, provided is a reusable anchor apparatus removably securable to a wall having a sheathing material, the apparatus includes a housing having an inner end, an outer end, a longitudinal axis extending therebetween, and a restraining member preventing insertion of the housing completely through the sheathing material. The apparatus also includes a first finger extending from the inner end of the housing, a second finger extending from the inner end of the housing, opposing the first finger and attachment means pivotally coupling the first finger and the second finger to the inner end of the housing. The apparatus further includes actuator means for moving the first finger and the second finger between a retracted position in which the fingers extend substantially parallel to the longitudinal axis, and an extended position in which the first finger and the second finger are substantially upright with respect to the longitudinal axis in opposing directions.

The first finger and the second finger each include a pivot end coupled by the attachment means to the inner end of the housing, an engagement end opposite the pivot end for engagement with the sheathing material, and a camming surface formed between the pivot end and the engagement end, upon which the actuator means operates.

In a further aspect of the present invention, the actuator means includes a plunger reciprocally movable within the housing between a depressed position and a withdrawn position, the plunger including an outer end for moving the plunger and a finger driving end for engaging each camming surface of the first finger and the second finger, the plunger locking the first finger and the second finger into the extended position upon full depression and unlocking the first finger and the second finger upon withdrawal.

The above problems and others are solved and the above objects further realized in methods of using the anchor apparatus.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a perspective view of a first embodiment of an anchor apparatus constructed in accordance with the teachings of the present invention, as it would appear acting as a door stop, and closing a hole formed by a doorknob;

FIG. 2 is a perspective view of the anchor apparatus of FIG. 1 as it would appear positioned for insertion into an opening in a wall;

FIG. 3 is a perspective view illustrating the anchor of FIGS. 1 and 2 in the secure position;

FIG. 4 is a an exploded perspective view of the anchor apparatus of FIGS. 1-3;

FIG. 5 is a cross sectional side view of the anchor apparatus of FIGS. 1-4, in the insert position;

FIG. 6 is a cross sectional side view of the anchor apparatus of FIGS. 1-5, illustrating the transition from insert position to secure position;

FIG. 7 is a cross sectional side view of the anchor apparatus of FIGS. 1-6 in the secure position, securing the apparatus to a wall;

FIG. 8 is a rear view of the anchor apparatus of FIGS. 1-7 as it would appear secured to a wall;

FIG. 9 is a perspective view of an alternate embodiment of an anchor apparatus in the insert position;

FIG. 10 is a perspective view illustrating the alternate embodiment of FIG. 9 as it would appear in the secure position;

FIG. 11 is a cross sectional side view of the anchor apparatus of FIGS. 9 and 10 as it would appear in the insert position inserted through an opening in a wall;

FIG. 12 shows a cross sectional side view of the alternate anchor apparatus of FIGS. 9-11 as it would appear inserted through an opening in a wall and in transition between the insert position and the secure position;

FIG. 13 is a cross sectional side view of the alternate apparatus of FIGS. 9-12 as it would appear inserted through an opening in a wall and in the secure position;

FIG. 14 is a sectional view taken along line 14-14 of FIG. 9;

FIG. 15 is a perspective view illustrating an accessory configuration of the alternate anchor of FIGS. 9-14;

FIG. 16 is a perspective view of another accessory configuration of the alternate anchor apparatus of FIGS. 9-14;

FIG. 17 is a perspective view of yet another accessory configuration of alternate anchor apparatus of FIGS. 9-14;

DETAILED DESCRIPTION OF THE PREFERRED EMBODIMENTS

Figure 19:
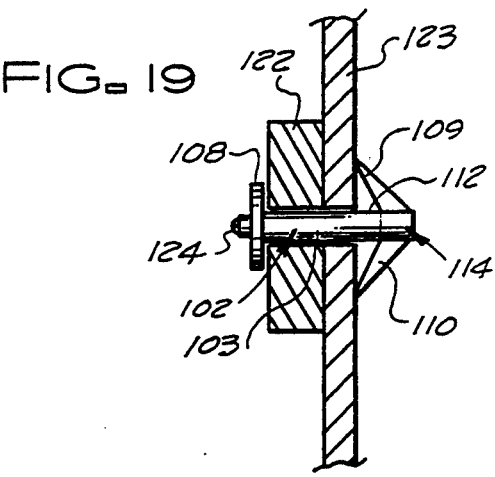
FIG. 19 s a cross sectional side view illustrating the embodiment of the anchor apparatus of FIG. 18 as it would appear inserted through an opening in a wall and in the secure position.

Turning now to the drawings in which like reference characters indicate corresponding elements throughout the several views, attention is first directed to FIG. 1 which illustrates a reusable anchor apparatus generally designated 10. Anchor apparatus 10 is illustrated fitted to a portion of drywall 12 corresponding to a doorknob 13 mounted on door 14 to act as a door stop. To mount anchor apparatus 10, a hole 15 formed in drywall 12 is required. Hole 15 maybe formed intentionally in a conventional manner, or unintentionally by unrestrained opening of door 14, driving doorknob 13 into and through drywall 12. Anchor apparatus 10 is preferably employed for repairing the latter formed hole 15, closing the damage to drywall 12 and subsequently acting as a door stop. Drywall 12 acts as a sheathing for a frame wall. One skilled in the art will understand that anchor apparatus 10 and subsequent embodiments, may be employed with substantially any sheathing material, such as plywood, sheet rock, etc. Furthermore, anchor apparatus 10 and subsequent embodiments, may be employed for attachment to any panel. One skilled in the art will understand that a panel is any material having two opposing surfaces.

Anchor apparatus 10 is equipped with a rubber bumper 17 carried by a wall plate 18. Wall plate 18 is carried by a housing 19 which is fitted within hole 15 such that wall plate 18 acts as a restraining member, engaging an outer surface 20 of drywall 12 surrounding hole 15 and preventing housing 19 from being inserted completely through drywall 12. An engagement assembly 22 is carried by housing 19 opposite wall plate 18, for engaging an inner surface 23 of drywall 12, thereby fixing anchor apparatus 10 firmly in place. For purposes of this description, inward or inner is a direction toward the inside of a wall (not shown), sheathed with drywall 12, and outward or outer is a direction toward the outside of a wall (not shown) sheathed with drywall 12.

Engagement assembly 22 of anchor apparatus 10 consists of a plurality of opposing fingers 24 moveable between a retracted or insert position, illustrated in FIG. 2, and an expanded or secure position, illustrated in FIG. 3. Fingers 24 are moved into the expanded position in a camming action, by a plunger 25 which extends through wall plate 18 and housing 19 to engage fingers 24.

Turning now to FIG. 4, anchor apparatus 10 consists of housing 19 which is preferably a tubular member, for easy insertion into a generally round hole formed by a doorknob, having an inner end 27, an outer end 28 and a longitudinal axis extending therebetween. Inner end 27 of housing 19 pivotally carries fingers 24. Fingers 24 are generally L-shaped, having a pivot end 29 at the end of the short length, and an engagement end 30 terminating the long length. The outer surface of the angle of the L-shaped fingers 24 provide a cam surface 32 which will be discussed in greater detail below. A pair of axles 33 and 34 extend through inner end 27 of housing 19 in a parallel spaced apart relationship, perpendicular to the longitudinal axis thereof. Fingers 24 are evenly divided between and configured to pivot on axles 33 and 34 extending through bores 35 formed through pivot end 29 of Fingers 24. Fingers 24 are divided into two groups 24a and 24b, with group 24a pivotally carried by axle 33 and group 24b pivotally carried by axle 34 in the reverse orientation with respect to fingers 24a. Fingers 24a and 24b interlock when in the retracted position, with fingers 24a and 24b interspersed evenly. Fingers 24 are actuated between the retracted position and the extended position by plunger 25, consisting of a reciprocally moveable shaft 37 extending along the longitudinal axis of housing 19, terminating at an inner end 38 with a finger driving plate 39, which engages cam surfaces 32 of fingers 24, and terminating at an outer end 40 with a plunger plate 42. Plunger 25 is reciprocally moveable between a withdrawn position and a depressed position. Plunger plate 42 has an inner surface 43 with a central recess 44 configured to receive outer end 40 of shaft 37. Shaft 37 is fixed to plunger plate 42 by any conventional manner, such as conventional adhesives, or preferably, a screw 45 extending through plunger plate 42 into shaft 37. Rubber bumper 17 is fixed to an outer surface 47 of plunger plate 42 for cushioning doorknob 13 and protecting wall plate 18 and plunger plate 42. Outer end 28 of housing 19 is received about a plug 48 extending generally centrally from an inner surface 49 of wall plate 18. An outer surface 50 of wall plate 18 is configured to receive inner surface 43 of plunger plate 42 thereagainst. A shaft bore 52 extends generally centrally through plug 48 and wall plate 18, for slideably receiving shaft 37 of plunger 25.

In operation, anchor apparatus 10 is placed in the retracted or insert position as illustrated in FIG. 5. In the retracted or insert position, plunger 25 is in the withdrawn position, wherein plunger plate 42 is separated from wall plate 18 thereby positioning finger driving plate 39 proximate outer end 28 of housing 19. In this position, fingers 24a and 24b are interlocked with camming surfaces 32 pivoted outward towards outer end 28 of housing 19 and engaging finger driving plate 39. As can be seen with continued reference of FIG. 5, fingers 24 are contained within a longitudinally extended radius of housing 19, allowing insertion of fingers 24 and housing 19 through hole 15 in drywall 12. Anchor apparatus 10 is positioned such that inner surface 49 of wall plate 18 engages outer surface 20 of drywall 12.

Referring to FIG. 6, to secure anchor apparatus 10 in position, plunger 25 is moved inward in the direction indicated by arrowed line A, to the depressed position. Shaft 37 slides through wall plate 18, forcing finger driving plate 39 against camming surfaces 32 of fingers 24. The action of finger driving plate 39 against camming surfaces 32 pivots fingers 24, with fingers 24a rotating in a direction indicated by arcuate arrowed line B and fingers 24b rotating opposite to fingers 24a, in a direction indicated by arcuate arrowed line C. As plunger 25 moves inward, finger driving plate 39 acts against camming surfaces 32 causing a camming motion, forcing fingers 24a and 24b in opposing directions to the extended or secure position as illustrated in FIGS. 7 and 8. As fingers 24 move to the extended position, engagement ends 30 engage inner surface 23 of drywall 12 pulling housing 19 inward such that inner surface 49 of wall plate 18 firmly engages outer surface 20 of drywall 12. In this extended position, anchor apparatus 10 is securely coupled to drywall 12, closing hole 15.

Fingers 24 are locked in the extended position by finger driving plate 39, which is positioned between fingers 24a and 24b engaging the short lengths thereof and, in this depressed position, preventing fingers 24a and 24b from pivoting inward to the retracted or insert position. Anchor apparatus 10 may be removed by moving plunger 25 outward toward the withdrawn position, removing finger driving plate 39 from between fingers 24a and 24b. This permits fingers 24a and 24b to pivot back to the retracted or insert position allowing withdrawal of anchor apparatus 10 from hole 15.

Turning now to FIG. 9, an alternate anchor apparatus generally designated 60 is illustrated. Anchor apparatus 60 includes a housing 62 having an inner end 63 and an outer end 64. Housing 62 is preferably a cylindrical tube having a longitudinal axis, and a flange 65, acting as a restraining member, extending outward from outer end 64 substantially perpendicularly to the longitudinal axis. A pair of fingers 67 and 68 extend from opposite sides of inner end 63 generally along the longitudinal axis. A plunger 70 is carried by housing 62 reciprocally moveable between a withdrawn position and a depressed position, and consists of a shaft 72 terminating at a finger driving end 73 and an opposing outer end 74. A plunger plate 75 is coupled to outer end 74 for engagement with flange 65.

Fingers 67 and 68 are substantially identical, and are positioned opposing one another. Fingers 67 and 68 are generally rectangular in profile, and in this embodiment, are trough shaped with the sides of the trough facing one another in a nesting engagement as can be seen with additional reference to FIG. 14. Viewing fingers 67 and 68 in profile, each finger includes a pivotal apex 77, a camming apex 78, and a terminal apex 79. Pivotal apex 77 pivotally couples fingers 67 and 68 to opposing sides of inner end 63. While fingers 67 and 68 may be hinged to inner end 63 of housing 62 by an axle or hinge device, for simplicity, housing 62 and fingers 67 and 68 are formed from molded plastic, with the fingers integrally formed with the housing and hinged by a groove 80 formed in the material. Grooves 80 are clearly visible in FIG. 11. Fingers 67 and 68 are movable between a retracted or insert position in which a contact portion 82 of fingers 67 and 68, extending between pivotal apex 77 and terminal apex 79, extends from housing 62 substantially parallel to the longitudinal axis, and an extended or secure position in which fingers 67 and 68 are pivoted outward, with contact portion 82 generally upright with respect to the longitudinal axis, as can be seen in FIG. 10. Camming apex 78 extends into housing 62 when in the retracted or insert position, and is configured to be engaged by finger driving end 73 of plunger 70. A camming surface 81 extends between pivotal apex 77 and camming apex 78 of each finger, and is acted upon by finger driving end 73 of plunger 70, to move fingers 67 and 68 to the extended position.

In operation, fingers 67 and 68 in the retracted position are inserted into an opening 83 formed through a portion of drywall 84 having an inner surface 85 and an outer surface 87, as can be seen with reference to FIG. 11. Housing 62 is received within opening 83, with flange 65 engaging outer surface 87 of drywall 84 around the edge of opening 83.

Referring now to FIG. 12, to securely fix anchor apparatus 60 in position, plunger 70 is moved inward by pressure exerted on plunger plate 75 in the direction indicated by arrowed line D. Finger driving end 73 engages camming surface 81, pivoting fingers 67 and 68 at grooves 80, outward in opposite directions. Fingers 67 and 68 are driven outward in a direction indicated by arcuate arrowed lines E and F respectively, moving finger contact surfaces 82 generally upright with respect to the longitudinal axis.

Referring now to FIG. 13, in the fully extended position, fingers 67 and 68 are forced outward from the longitudinal axis, until terminal apex 79 engage inner surface 85 of drywall 84, firmly pulling flange 65 against outer surface 87 of drywall 84. Finger 67 and 68 are locked in position by the engagement of shaft 72 with camming surfaces 81 of fingers 67 and 68. The positioning of shaft 72 between camming surfaces 81 of fingers 67 and 68 locks anchor apparatus 60 to drywall 84. The removal of anchor apparatus 60 requires the movement of plunger 70 in an outward direction, removing shaft 72 from between camming surfaces 81. This permits fingers and 68 to be moved toward the retracted position as anchor apparatus 60 is removed.

Still referring to FIG. 13, a threaded bore 88 is formed through plunger plate 75 into shaft 72. Threaded bore 88 is configured to receive a screw 89 therein for securing items to anchor apparatus 60 and thereby drywall 84.

Turning now to FIGS. 15–17, alternate embodiments of accessories associated with anchor apparatus 60 are illustrated. Referring specifically to FIG. 15, a conventional towel rack may be removably hung from a wall. Towel rack 90 includes an end 92 affixed to the outer surface of flange 65 and has a bore 93 extending therethrough permitting reciprocal motion of a plunger. Plunger 70 described above in connection with FIGS. 9–14 has been replaced with a plunger 94 having a longer shaft 95. Shaft 95 has been enlongated to extend through towel rack 90 and allow access to impart reciprocal movement thereto. Applying anchor apparatus 60 in this matter, permits towel rack 90 to be hung upon a wall and removed as desired.

FIG. 16 illustrates a further embodiment of an accessory consisting of a hook 97 affixed to outer end 74 of shaft 72 replacing plunger plate 75. In this manner, a hook may be easily installed on a wall, removed, and reinstalled as desired.

FIG. 17 illustrates yet a further embodiment of an accessory apparatus consisting of a tab 98 having an opening 99 proximate one end. Opening 99 receives shaft 72 of plunger 70 therethrough, and is firmly held against flange 65 by plunger plate 75 when anchor apparatus 60 is in the secure position. Tab 98 would permit a variety of articles to be hung from an opening 100 formed in an opposing opening 99.

Figure 18:
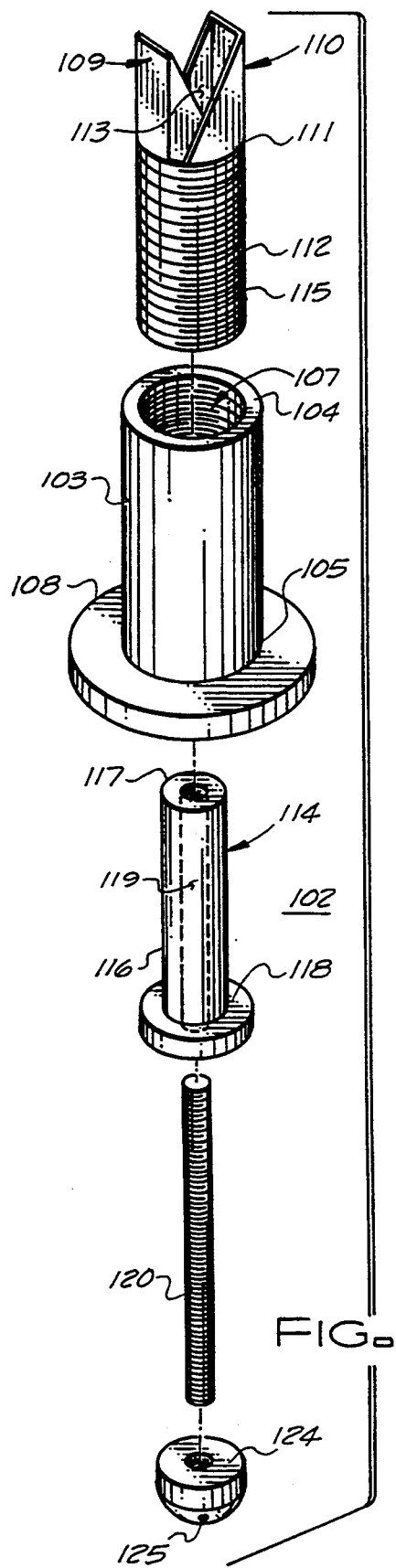
FIG. 18 is an exploded perspective view of a further embodiment of an anchor apparatus.

A further embodiment of an anchor apparatus, generally designated 102 is illustrated in FIG. 18. Anchor apparatus 102 includes a generally tubular housing 103 having an inner end 104, an outer end 105, a threaded inner surface 107 extending between inner end 104 and outer end 105, and a flange 108, acting as a restraining member, extending radially outward from outer end 105. A pair of opposing fingers 109 and 110, generally identical to fingers 67 and 68, are pivotally carried by an inner end 111 of a tubular extension 112 in a manner substantially identical to the attachment of 67 and 68 to inner end 63 of housing 62. Tubular extension 112 includes a bore 113 extending longitudinally therethrough which slideably receives a plunger 114, and has a threaded outer surface 115, configured to be threaded into housing 103 at inner end 104.

Plunger 114 consists of a shaft 116 having a finger driving end 117 and an opposing outer end 118. Shaft 116 is slideably received within housing 103 and tubular extension 112. Finger driving end 117 works upon fingers 109 and 110 as was described above in the description of apparatus 60. Plunger 114 includes a threaded bore 119 extending longitudinally through shaft 116 from finger driving end 117 to outer end 118, for receiving a threaded extender member 120. Tubular extension 112 and threaded extension member 120 permit adjustment of anchor apparatus 102 for varied wall thickness as illustrated in FIG. 19.

Still referring to FIGS. 18 and 19, a panel 122 is illustrated being attached to a drywall 123 with anchor apparatus 102. As can be seen, panel 122 and drywall 123 have a combined thickness greater than the thickness of drywall 123 alone. Anchor apparatus 102 may be adjusted for use on drywall 123 alone, or as shown of FIG. 19, anchor apparatus 102 may be adjusted for anchoring through a greater distance. Tubular extension 112 is threaded away from housing 103, thereby increasing the distance between fingers 109 and 110, and flange 108. This permits anchor apparatus 102 to be inserted through panel 122 and drywall 123. Since plunger 114 must be correspondingly longer to permit inward movement thereof to drive fingers 109 and 110, threaded extender member 120 allows a plunger button 124,i threaded to threaded extender member 120, to be moved inward or outward with respect to housing 103. The inner or outer extension of threaded extender member 120 is adjusted to correspond to inner or outer movement of tubular extension 112. When plunger 114 is fully depressed, threaded extender member 120 extends plunger button 124 outward from housing 103, allowing access by an individual for withdrawal of plunger 114 and removal of anchor apparatus 102. To aid in outward movement of plunger 114, a hook hole 125 may be formed in plunger button 124. Hook hole 125 will receive a hook member, such as a nail, bent paper clip, etc., to allow plunger 114 to be moved outward, and anchor apparatus 102 to be removed from a wall.

Figure 20:
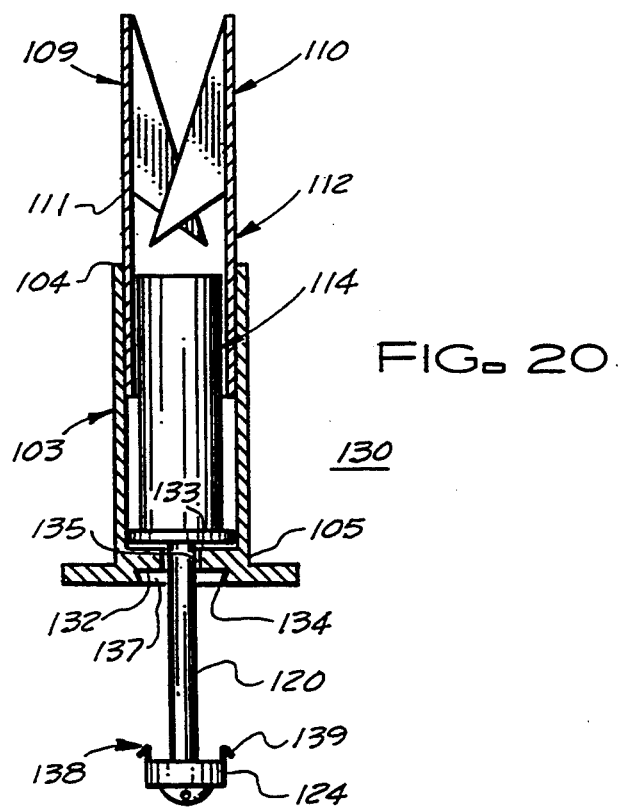
FIG. 20 is a cross sectional side view of the anchor apparatus of FIGS. 18 and 19 as it would appear in the insert position.

Turning now to FIG. 20, a further embodiment of an anchor apparatus incorporating the teachings of the instant invention and generally designated by the reference character 130 is illustrated. In common with the previously described embodiment 102, the immediate embodiment includes housing 103 having inner end 104 and outer end 105, fingers 109 and 110 extending from tubular extension 112, a plunger 114, a threaded extender member 120, and a plunger button 124 coupled to threaded extender member 120.

Uniquely, the immediate embodiment includes an end wall 132 closing outer end 105 of housing 103. End wall 132 includes an inner surface 133 and an outer surface 134, and retains plunger 114 within housing 103 and tubular extension 112. A bore 135 centrally formed through end wall 132, slideably receives threaded extender member 120 therethrough, to permit communication between threaded extender member 120 and plunger 114 within housing 103. A recess 137 formed in outer surface 134 of end wall 132 receives plunger button 124 therein when plunger 114 is depressed. A plunger button engagement mechanism 138 extends from plunger button 124, and engages the sides of recess 137, thereby retaining plunger button 124 therewithin. In this embodiment, plunger button engagement mechanism 138 consists of opposing spring latches 139 which compress as recess 137 receives plunger button 124, and expand against and engage the side of recess 137 when plunger button 124 is fully received within recess 137.

Figure 21:
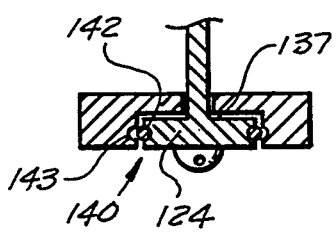
FIG. 21 is an enlarged sectional side view of a portion of the anchor apparatus, illustrating an alternate plunger button engagement mechanism.

FIG. 21 illustrates an alternate engagement mechanism generally designated 140, consisting of projections 142 extending from the edges of plunger button 124. Projections 142 engage depressions 143 formed in the sides of recess 137, when plunger 114 is in the fully depressed position.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A reusable anchor apparatus removably securable to a panel, said apparatus comprising:
   a housing having an inner end and an outer end through which a longitudinal axis extends;
   an engagement assembly including a plurality of fingers pivotally coupled to said housing proximate said inner end, said plurality of fingers moveable between a retracted position wherein said fingers extend from said housing substantially parallel to said longitudinal axis and an extended position wherein said fingers are pivoted past a perpendicular to said longitudinal axis, towards said outer end; and
   actuator means for moving said plurality of fingers between said retracted position and said extended position.

2. A reusable anchor apparatus as claimed in claim 1 wherein each of said plurality of fingers includes:
   a pivot end coupled by attachment means to said housing proximate said inner end, said pivot end positioned to be spaced apart from said panel in a direction substantially perpendicular thereto;
   an engagement end opposite said pivot end for engagement with said panel; and
   a camming surface formed between said pivot end and said engagement end, upon which said actuator means operates.

3. A reusable anchor apparatus as claimed in claim 2 wherein said actuator means includes a plunger reciprocally slidable within said housing between a depressed position and a withdrawn position, said plunger including an outer end for moving said plunger and a finger driving end for engaging each said camming surface of said plurality of opposing fingers, said plunger locking said plurality of opposing fingers into said extended position in the depressed position and unlocking said plurality of opposing fingers in the withdrawn position.

4. A reusable anchor apparatus as claimed in claim 3 wherein said attachment means includes a pair of substantially parallel, spaced apart axles extending across said inner end of said housing, said axles journalled within said pivot ends of opposing ones of said plurality of opposing fingers.

5. A reusable anchor apparatus as claimed in claim 3 wherein said attachment means includes said housing and said plurality of fingers being integrally formed, and pivotally joined by material therebetween.

6. A reusable anchor apparatus as claimed in claim 3 wherein said attachment means includes a tubular extension having an inner end and an outer end, said outer end adjustably coupled to said inner end of said housing, and said plurality of fingers extending from said inner end.

7. A reusable anchor apparatus as claimed in claim 6 further comprising a threaded extender member adjustably coupled to said outer end of said plunger for extending the length of said plunger, said threaded extender member terminating in a plunger button.

8. A reusable anchor apparatus as claimed in claim 6 further comprising a plunger button engagement mechanism for securing said plunger button to said outer end of said housing.

9. A reusable anchor apparatus removably securable to a panel, said apparatus comprising:
   a housing having an inner end, an outer end, a longitudinal axis extending therebetween, and a restraining member preventing insertion of said housing completely through said panel;
   a first finger extending from said inner end of said housing;
   a second finger extending from said inner end of said housing, opposing said first finger;
   attachment means pivotally coupling said first finger and said second finger to said inner end of said housing; and
   actuator means for moving said first finger and said second finger between a retracted position in which said fingers extend substantially parallel to said longitudinal axis and an extended position in which said first finger and said second finger are pivoted substantially passed perpendicular toward said outer end, with respect to said longitudinal axis, in opposing directions.

10. A reusable anchor apparatus as claimed in claim 9 wherein said first finger and said second finger each include:
    a pivot end coupled by said attachment means to said inner end of said housing;
    an engagement end opposite said pivot end for engagement with said panel; and
    a camming surface formed between said pivot end and said engagement end, upon which said actuator means operates.

11. A reusable anchor apparatus as claimed in claim 10 wherein said actuator means includes a plunger reciprocally slidable within said housing between a depressed position and a withdrawn position, said plunger including an outer end for moving said plunger and a finger driving end for engaging each said camming surface of said first finger and said second finger, said plunger locking said first finger and said second finger into said extended position upon full depression and unlocking said first finger and said second finger upon withdrawal.

12. A reusable anchor apparatus as claimed in claim 11 wherein said attachment means includes:
- a first axle extending across said inner end of said housing, said pivot end of said first finger pivotally carried thereby; and
- a second axle extending across said inner end of said housing substantially parallel to and spaced from said first axle, said pivot end of said second finger pivotally carried thereby.

13. A reusable anchor apparatus as claimed in claim 11 wherein said attachment means includes said housing and said first and said second fingers being integrally formed, and pivotally joined by material therebetween.

14. A reusable anchor apparatus as claimed in claim 11 wherein said attachment means includes a tubular extension having an inner end and an outer end, said outer end adjustably coupled to said inner end of said housing, and said first finger and said second finger extending from said inner end of said tubular extension.

15. A reusable anchor apparatus as claimed in claim 14 further comprising a threaded extender member adjustably coupled to said outer end of said plunger for extending the length of said plunger, said threaded extender member terminating in a plunger button.

16. A reusable wall reusable anchor apparatus as claimed in claim 15 further comprising a plunger button engagement mechanism for securing said plunger button to said outer end of said housing.

17. A method of securing and removing an anchor apparatus in a panel, said method comprising the steps of:
- providing an anchor apparatus including a housing having an inner end and an outer end through which a longitudinal axis extends;
- an engagement assembly including a plurality of fingers pivotally coupled to said housing proximate said inner end, said plurality of fingers moveable between a retracted position wherein said fingers extend from said housing substantially parallel to said longitudinal axis and an extended position wherein said fingers are pivoted past a perpendicular to said longitudinal axis, towards said outer end; and
- actuator means for moving said plurality of fingers between said retracted position and said extended position;
- providing a hole in a wall;
- inserting said anchor apparatus in said retracted position, into said hole;
- moving said anchor apparatus to said expanded position, securing said anchor apparatus in place;
- moving said anchor apparatus to said retracted position; and
- removing said anchor apparatus.

18. A method as claimed in claim 17 wherein the step of providing an anchor apparatus includes providing actuator means comprising:
- a plunger reciprocally slidable within said housing between a depressed position and a withdrawn position, said plunger including an outer end for moving said plunger and a finger driving end for engaging each said camming surface of said plurality of fingers.

19. A method as claimed in claim 18 wherein the step of moving said anchor apparatus to said expanded position and securing it in place includes the steps of moving said plunger to said depressed position.

20. A method as claimed in claim 18 wherein the step of moving said anchor apparatus to said retracted position includes moving said plunger to said withdrawn position.

* * * * *